US008422398B2

(12) United States Patent
Ripstein et al.

(10) Patent No.: US 8,422,398 B2
(45) Date of Patent: Apr. 16, 2013

(54) MEDIA ACCESS CONTROL (MAC) FOR AN ACTIVE RFID SYSTEM

(75) Inventors: Idit Ripstein, Ramat Gan (IL); Yaron Soffer, Nes Ziona (IL); Dani Raphaeli, Kfar Saba (IL); Gideon Kaplan, Kiryat Ono (IL)

(73) Assignee: Zebra Enterprise Solutions Corp., Oakland, CA (US)

( * ) Notice: Subject to any disclaimer, the term of this patent is extended or adjusted under 35 U.S.C. 154(b) by 608 days.

(21) Appl. No.: 12/018,228

(22) Filed: Jan. 23, 2008

(65) Prior Publication Data

US 2009/0185505 A1 Jul. 23, 2009

(51) Int. Cl.
H04L 12/28 (2006.01)
H04B 7/212 (2006.01)

(52) U.S. Cl.
USPC .......................................... 370/254; 370/347

(58) Field of Classification Search .................. None
See application file for complete search history.

(56) References Cited

U.S. PATENT DOCUMENTS

| 6,501,582 | B2 | 12/2002 | Chiou et al. | |
| 6,785,510 | B2 | 8/2004 | Larsen | |
| 6,987,770 | B1 | 1/2006 | Yonge, III | |
| 6,992,986 | B2 | 1/2006 | Reza et al. | |
| 7,209,447 | B1* | 4/2007 | Marsh et al. | 370/237 |
| 7,257,095 | B2 | 8/2007 | Liu | |
| 7,706,340 | B2* | 4/2010 | Bronez | 370/338 |
| 2004/0066281 | A1* | 4/2004 | Hughes et al. | 340/10.2 |
| 2004/0156345 | A1* | 8/2004 | Steer et al. | 370/338 |
| 2005/0048914 | A1* | 3/2005 | Sartori et al. | 455/11.1 |
| 2006/0087407 | A1 | 4/2006 | Stewart et al. | |
| 2006/0116853 | A1* | 6/2006 | Rappaport et al. | 702/182 |
| 2006/0209781 | A1* | 9/2006 | Wood, Jr. | 370/347 |
| 2006/0267736 | A1* | 11/2006 | Tiernay et al. | 340/10.51 |
| 2007/0109100 | A1 | 5/2007 | Jett et al. | |
| 2008/0094182 | A1* | 4/2008 | Sugano et al. | 340/10.5 |
| 2008/0106382 | A1* | 5/2008 | Choi et al. | 340/10.2 |
| 2008/0297324 | A1* | 12/2008 | Tuttle | 340/10.33 |
| 2009/0058652 | A1* | 3/2009 | Hardy et al. | 340/572.1 |

FOREIGN PATENT DOCUMENTS

WO WO03/098528 11/2003
WO WO2006/030422 3/2006

* cited by examiner

Primary Examiner — John Blanton
(74) Attorney, Agent, or Firm — Alston & Bird LLP

(57) ABSTRACT

A system of radio frequency communication between Readers and Tags having a scalable Media Access Control (MAC) protocol for an active RFID system employing multiple access. The system comprising at least one tag Reader and a plurality of Tags each having a unique tag ID and deployed in a region in which at least some of the Tags are in radio communication with the tag Reader A multi-dimensional addressing scheme of the MAC protocol enables division of the plurality of Tags into a number of groups for different stages of MAC protocol processing, based on different portions of the tag ID. The MAC has an inherent flexibility in the sense that it allows readers to communicate with different versions of tags and also optimize communication parameters to reader's capabilities, without pre-configuration of the tags. Furthermore, the MAC supports means to achieve very high access reliability, such as relay between tags.

14 Claims, 6 Drawing Sheets

MEDIA ACCESS CONTROL (MAC) FOR AN ACTIVE RFID SYSTEM

FIELD AND BACKGROUND OF THE INVENTION

The present invention relates to radio frequency Tags-Readers for communication, identification and distance measurement and, in particular, it concerns a Media Access Control (MAC) for a system of radio frequency communication between Readers and Tags employing multiple access.

The need for RFID system grows in many areas and for a large diversity of applications, such as asset management and tracking, process control, and asset visibility. It is expected that the use of active RFID devices will reach mass deployments in the future; however at the current time, some limiting factors still exist, among them tag prices, and also some performance limitations. One of the major factors that affects system performance, is the MAC (or the "air interface" protocol).

Prior art MAC schemes include the IEEE 802.11 standard that forms the basis of the WiFi networking which is used all over the world, as well as the IEEE 802.15.4 standard that forms the basis of ZigBee devices. There are also numerous proprietary communication protocols.

The IEEE 802.11 MAC scheme is basically suited for file transfers and not for short packet transfer. While 802.11 offers a very good solution for connection to the Internet for "high-end" mobile devices, such as laptop computers, it is not optimized for very low end devices with hard battery life, cost and size constrains. It does not seem to be the right choice for a scalable active RFID system.

The IEEE 802.15.4 MAC scheme defines two types of Tag devices, namely Reduced Function Devices (RFDs) and Full Function Devices (FFDs), and assumes that devices alternate between "on" and "off" modes. The originator of messages is the RFD. This is one of the reasons that such scheme is not ideal for RFID applications. Another concern is that the system supports Mesh connectivity only between FFDs, while RFDs can connect only to a FFD. Yet another important consideration is that most ZigBee applications deal with a small to medium number of networked devices (e.g. for home control or for automatic meter reading). Further, the 802.15.4 multiple access scheme has a fixed structure.

Radio Frequency IDentification (RFID) is a method of storing and remotely retrieving data using devices called RFID Tags. An RFID Tag is a small device that can be attached to a physical object, animal, or person. Each tag has a unique tag identification number (tag ID). RFID Tags receive and respond to radio-frequency queries from an RFID Reader or from neighboring Tags. An RFID system includes several components including mobile Tags, Tag Readers, and application software. This invention relates to a system using Active Tags (that is, Tags that have an internal power source and can receive and transmit RF signals). Due to the need to obtain a long life span for an active Tag that employs a small battery, the Tag typically alternates between "sleep" and "active" modes. It may typically be in the "active" mode 2% to 10% of the time.

The RFID system enables a query to be received by the mobile Tag and the Tag responds with data. The data is received by an RFID Reader and processed according to the needs of a particular application. The data transmitted by the Tag may provide identification or location information, or specifics about the product tagged, such as type, serial number, price, color, date of purchase.

U.S. Pat. No. 6,992,986, "Integrated self-optimizing multi-parameter and multi-variable point to multipoint communication system" to Reza et al., discloses an adaptive system for point to multipoint wireless communication. The Phy and MAC layers include an adaptive set of parameters. However, in this application, the base station adjusts communication with each customer premises equipment individually, according to the latter capabilities, link condition, etc; while in the current disclosure, the reader sends to the tag population some MAC parameters according to the reader's capabilities and to the assumed group size in each request, it is not required for tag to remember those parameters and it enables the tag to communicate with different readers accordingly.

U.S. Pat. No. 7,257,095, "Power saving via physical layer address filtering in WLANs" to Liu, describes a system and method for saving power in a wireless network, using a physical layer address filtering protocol based on a partial address subset of the complete destination MAC address.

Several patents relate to the usage of relay communication. U.S. Pat. No. 6,785,510 "Routing in a multi-station network" to Larsen, teaches a method of relaying data between mobile stations in a cellular communication system. It is based on a broadcast control channel, as well as on a calling channel (or channels), by which the mobile station obtain connectivity information. This is very different from the system and method of relay that is disclosed in the current disclosure.

U.S. Pat. No. 6,501,582, "Cascaded line-of-sight free-space communication system" to Chiou et al., teaches an optical communication system where repeaters are used in order to relay data between stations.

U.S. Pat. No. 6,987,770 "Frame forwarding in an adaptive network" to Yonge, discloses a scheme which uses payload encapsulation and control information, to allow a frame originated from a first station, and intended for a second station, to be forwarded by an intermediate station. The first station selects the intermediate station based on the data transmission quality that is expected to be achieved.

RFID systems are generally used for a multitude of asset management applications. A warehouse, or a logistic center, may include a large number of tagged objects—say, thousands to hundred of thousands. In such a case there is more than one reader on site, and possibly tens of readers are employed to cover the whole volume. Therefore, it is necessary to "think networking"—namely, to design the communication process and protocol so as to allow efficient access to Tags while taking into account several basic factors and requirements:
  (a) The system may include a very large number of tagged objects but should be also efficient if only a small number of Tags is present.
  (b) Tags are typically low-cost devices, with limited functionality
  (c) Objects dynamically enter and/or leave the customer premises.
  (d) Tags alternate between on and off (or active & sleep) modes.
  (e) The main mode of communication is between Readers and Tags. In several useful RFID applications, the Reader (also called "Interrogator" in the RFID literature) is the originator of the session.
  (f) Having stated the above, the system needs to support some manner of Tag to Tag communication.
  (g) The Reader, when acting as a collector node, should be able to maintain a large aggregate data rate, keeping the response time for Tag querying low.
  (h) The overall system should be able to support many tagged objects communicating simultaneously.

(i) Unicast, Multicast and Broadcast modes should be supported, as these modes are useful in various workflows required by customers' operations (j) The MAC should be "power aware", that is to say able to operate with Tags that alternate between on and off (or active & sleep) modes (even with a low duty cycle).

(k) The MAC should support the basic application needs; the latter include Read tag data, Write tag data, and locate a tagged object.

(l) The communication reliability of the overall system, that is to say communication between the Readers and all Tags currently in the system at any given time, should be very high.

There is therefore a need for a Media Access Control (MAC) for a system of radio frequency communication between Readers and Tags that address most if not all of the above listed requirements.

SUMMARY OF THE INVENTION

The present invention is a Media Access Control (MAC) for a system of radio frequency communication between Readers and Tags employing multiple access.

According to the teachings of the present invention there is provided, a system of radio frequency communication between Readers and Tags, the system comprising; a) at least one tag Reader; b) a plurality of Tags deployed in a region in which at least some of the Tags are in radio communication with the tag Reader, and each tag is given a unique tag ID, and c) a Media Access Control protocol such that the tag Reader is configured to send and receive radio communication to and from at least some of the plurality of Tags, the plurality of Tags are configured to send and receive radio communication to and from the tag Reader and the Media Access Control protocol is configured to control the radio communication between the tag Reader and the plurality of Tags, and the Media Access Control protocol includes a multi-dimensional addressing scheme allowing Readers to efficiently address tag communities ranging from small to very large in unicast, multicast and broadcast modes, the multi-dimensional addressing scheme enables division of the plurality of Tags into a number of groups for different stages of Media Access Control protocol processing, based on different portions of the tag ID.

According to a further teaching of the present invention, a hash function is used to transform the tag ID into a pseudo random ID, so as to achieve better spreading of tag population and lower statistical dependency between dimensions.

According to a further teaching of the present invention, a portion of the tag ID is used for message screening in the PHY level and thereby avoid a need for at least one tag in the plurality of Tags to fully process a Media Access Control protocol portion of the radio communication.

According to a further teaching of the present invention, a portion of the tag ID is used for setting the on/off timing of at least one tag in the plurality of Tags.

According to a further teaching of the present invention, a portion of the ID is used by at least one tag to choose one reply window out of a set of possible reply windows.

According to a further teaching of the present invention, a portion of the ID is used by the tag Reader for addressing an acknowledgement to at least one Tag of the plurality of Tags that the tag Reader received a radio communication from the at least one Tag.

There is also provided according to the teachings of the present invention, a system of radio frequency communication between Readers and Tags, the system comprising; a) at least one tag Reader; b) a plurality of Tags deployed in a region in which at least some of the Tags are in radio communication with the tag Reader, at least some tags are in radio communication with other Tags in the plurality of Tags and each tag is given a unique tag ID, and c) a Media Access Control protocol such that the tag Reader is configured to send and receive radio communication to and from at least some of the plurality of Tags, the plurality of Tags are configured to send and receive radio communication to and from the tag Reader and other Tags in the plurality of Tags and the Media Access Control protocol is configured to control the radio communication between the tag Reader and the plurality of Tags, such that the Media Access Control protocol uses a combination of a session ID, acknowledgements and use of other tags as relays to achieve high reliability of radio communication, in broadcast, multicast and unicast modes.

According to a further teaching of the present invention, a portion of the tag ID is used by the tag Reader to indicate to at least one tag of the plurality of Tags that the tag Reader received a the radio communication from that particular tag.

According to a further teaching of the present invention, the tag Reader initiates a relay session after a rate of direct replies from the plurality of tags falls below a predetermined threshold.

According to a further teaching of the present invention, each broadcast message is given a session ID, and at least one tag of the plurality of tags replies to radio communications having a particular session ID until the at least one tag receives an acknowledgement radio communication having the same session ID.

There is also provided according to the teachings of the present invention, a system of radio frequency communication between Readers and Tags, the system comprising; a) at least one tag Reader; b) a plurality of Tags deployed in a region in which at least some of the Tags are in radio communication with the tag Reader, at least some tags are in radio communication with other Tags in the plurality of Tags and c) a Media Access Control protocol such that the tag Reader is configured to send and receive radio communication to and from at least some of the plurality of Tags, the plurality of Tags are configured to send and receive radio communication to and from the tag Reader and other Tags in the plurality of Tags and the Media Access Control protocol is configured to control the radio communication between the tag Reader and the plurality of Tags; wherein the Media Access Control protocol includes tag reply parameters in each the radio communication so as to enable tags to respond to the tag Reader in an optimal manner for that tag Reader's capabilities.

According to a further teaching of the present invention, the radio communication includes an indication of the payload starting point, and each generation of tag Readers and/or Tags decode that portion of the Media Access Control protocol with which it is familiar, ignores that portion of the Media Access Control protocol with which it is unfamiliar and jumps to the payload start point, and the radio communication includes a block of variable length, such that old generation Tags forward the block without decoding, and new generation tag Readers and/or Tags decode and modify the block as needed.

There is also provided according to the teachings of the present invention, a system of radio frequency communication between Readers and Tags, the system comprising; a) at least one tag Reader; b) a plurality of Tags deployed in a region in which at least some of the Tags are in radio communication with the tag Reader, and c) a Media Access Control protocol such that the tag Reader is configured to send and receive radio communication to and from at least some of the plurality of Tags, the plurality of Tags are configured to send and receive radio communication to and from the tag Reader and the Media Access Control protocol is configured to control the radio communication between the tag Reader and the plurality of Tags; wherein the radio communication includes an indication of a payload start point, and each generation of tag Readers and/or Tags decode that portion of the Media Access Control protocol with which it is familiar, ignores that portion of the Media Access Control protocol with which it is unfamiliar and jumps to the payload start point, allowing reader to efficiently communicate with a mixture of tag generations and/or tag versions.

There is also provided according to the teachings of the present invention, a system of radio frequency communication between Readers and Tags, the system comprising; a) at least one tag Reader; b) a plurality of Tags deployed in a region in which at least some of the Tags are in radio communication with the tag Reader, at least some tags are in radio communication with other Tags in the plurality of Tags and c) a Media Access Control protocol such that the tag Reader is configured to send and receive radio communication to and from at least some of the plurality of Tags, the plurality of Tags are configured to send and receive radio communication to and from the tag Reader and other Tags in the plurality of Tags and the Media Access Control protocol is configured to control the radio communication between the tag Reader and the plurality of Tags; wherein the radio communication includes a block of variable length, such that old generation Tags forward the block without decoding, and new generation tag Readers and/or Tags decode and modify the block as needed.

According to a further teaching of the present invention, the radio communication includes an indication of payload start point, and each generation of tag Readers and/or Tags decode that portion of the Media Access Control protocol with which it is familiar, ignores that portion of the Media Access Control protocol with which it is unfamiliar and jumps to the payload start point allowing reader to efficiently communicate with a mixture of tag generations and/or tag versions.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
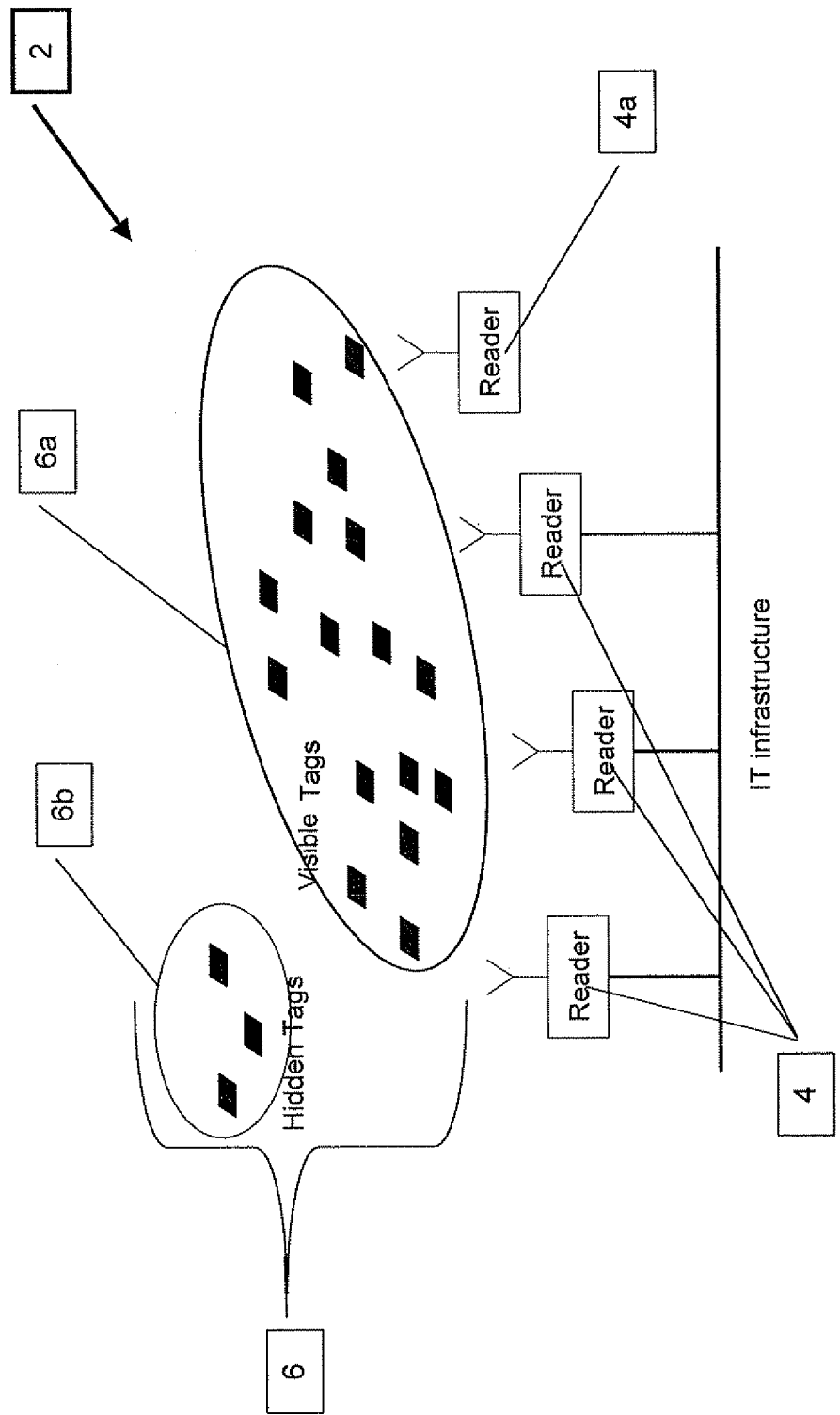
FIG. 1 is a schematic illustration of a system of radio frequency communication between Readers and Tags, constructed and operational according to the teachings of the present invention.

The present invention is a Media Access Control (MAC) for a system of radio frequency communication between Readers and Tags employing multiple access.

The principles and operation of a Media Access Control according to the present invention may be better understood with reference to the drawings and the accompanying description.

By way of introduction, in a system of radio frequency communication employing multiple access, it is possible to make use of the inherent capacity of devices which allow for multiple return transmissions from a plurality of Tags to a single Reader, possibly leading to a substantial throughput. However since the Tags should be low-complexity devices, there typically is no synchronization between them. Therefore, in the Tag-to-Reader direction the MAC follows basically the rules of ALOHA, with multiple time frequency or code slots. Such a MAC scheme is known in the art and reference is now made to two previous patent applications, PCT International Patent Application Publication Nos. WO2003/098528 and WO2006/030422, both of which are incorporated by reference for all purposes as if fully set forth herein.

PCT International Patent Application Publication No. WO2003/098528, (PCT Patent Application No. PCT/IL2003/00358), entitled "Method and system for distance determination of RF Tags" discloses an RFID system having the capability of automatically identifying unknown Tags by sending a broadcast interrogation message signal and receiving responses from all Tags that receive the message signal.

PCT International Patent Application Publication No. WO2006/030422 entitled (PCT Patent Application No. PCT/IL2005/000967), "Communication and Distance Measurement in an addressed Wide Band RFID System", deals with Unicast modes of communication, both Reader to Tag and Tag to Reader, as well as a Relay mode in which the Reader communicates with a Tag through an "intermediate" Tag.

These applications relate mainly to the application possibilities using wide band Tags, employing novel means of communication and air-interface of an Impulse Radio, which allows, in principle, for simultaneous response messages from a plurality of Tags to a single Reader's query message. Collision resolution in an ALOHA-type multiple access scheme, as disclosed in the aforementioned patent applications, forms a basis of the present invention. It should be noted that the term "message" is used herein to refer to a radio communication in either direction between a tag reader and at least one tag, and between a tag and one or more other tags. Therefore, the terms "message" and "radio communication" (when used as a noun) are used interchangeably herein.

Therefore, MAC of the present invention provides a method of communication between at least one tag Reader and a community of, preferably Active, Tags, in which the number of tags is dynamic and changing as tagged items are moved within, as well as into and out of, the monitored region. The MAC of the present invention self adjusts to the number of Tags in the community and is equally proficient with both small and very large communities of Tags. As used herein, the terms "small community" and "small number of Tags" generally refers to a Tag community ranging from several Tags to several tens of Tags. As used herein, the terms "very large community" and "very large number of Tags"

generally refers to a Tag community ranging from several tens of thousand of Tags to more than several hundreds of thousands of Tags. It will be appreciated, therefore, that a Tag community according to the present invention includes the full range from only a few Tags to hundreds of thousands of Tags.

Referring now to the drawings, FIG. 1 schematically illustrates a system, generally referred to as 2, composed of one or more Readers 4 and unknown number of Tags 6. The number of Tag may range for few dozens to X00,000. Readers and Tags communicate using wireless multiple access protocol allowing up to N stations to be received by a Reader simultaneously. Readers provide the "gateway" between the Tags and the Information Technology (IT) infrastructure, or between Tags and the user. In some cases the readers connect to an Edge Server that connects to the upper layer (that is, to the customer's IT infrastructure). The system may also contain a mixture of high-end Readers and low-end Readers, namely readers with a large capability as a collector node (in terms of aggregate rate supported) and reader with lower capabilities (supporting a lower number of simultaneous tag transmissions).

Some Tags 6a communicate with at least one Reader 4, while other, "hidden" Tags 6b are located such that they can not communicate with any of the Readers 4 in the system due to link budget limitations. It will be appreciated that Readers may be hardwired to the IT infrastructure or communicate with the IT infrastructure via wireless technology as illustrated by Reader 4a is FIG. 1.

In order to meet the requirements listed in the Field and Background section above, a combination of prior methods and new inventions is used. The following are features of the scaleable novel MAC scheme of the present invention.

A sophisticated addressing allowing Readers to efficiently address tag communities ranging from small to very large in unicast, multicast and broadcast modes, while allowing for the fluctuation in the number of Tags inherent if a dynamic tag community such as, but not limited to a warehouse, shipping yard or retail outlet.

Use of PHY address screening so as to allow the tag to screen non relevant messages after PHY header is decoded, based on the sophisticated addressing mentioned above, and reduce the amount of time the tag needs to be turned on for MAC address processing hence reducing power consumption.

High reliability so as to support a very large community of Tags with very high (99.9999%) reliability by ensuring communication with nearly all Tags in a X00,000 Tag environment Flexibility so as to allow Readers to communicate with new (incoming to the coverage area) Tags without having to first download the current system parameters and configuration, yet optimizing the Tags response to the current Reader configuration. Further more, flexibility to make Tags "future ready", that is, provide future compatibility with new generations of Tags without the need to update Tag software.

Sophisticated Addressing

The novel MAC protocol of the present invention allows easy addressing of both small and very big Tag communities.

Given a limited capacity of the uplink (Tags to Readers communication) capacity of the system, the addressing of a Reader to Tags broadcast should be done so the number of replies to a Reader will be optimized to the uplink multiple access capacity. Therefore, when addressing a small community of Tags, the broadcast addressing should divide the Tag community to a small number of groups. Similarly, when addressing a very large Tag community, the addressing should divide the Tag community to a large number of groups.

Figure 2:
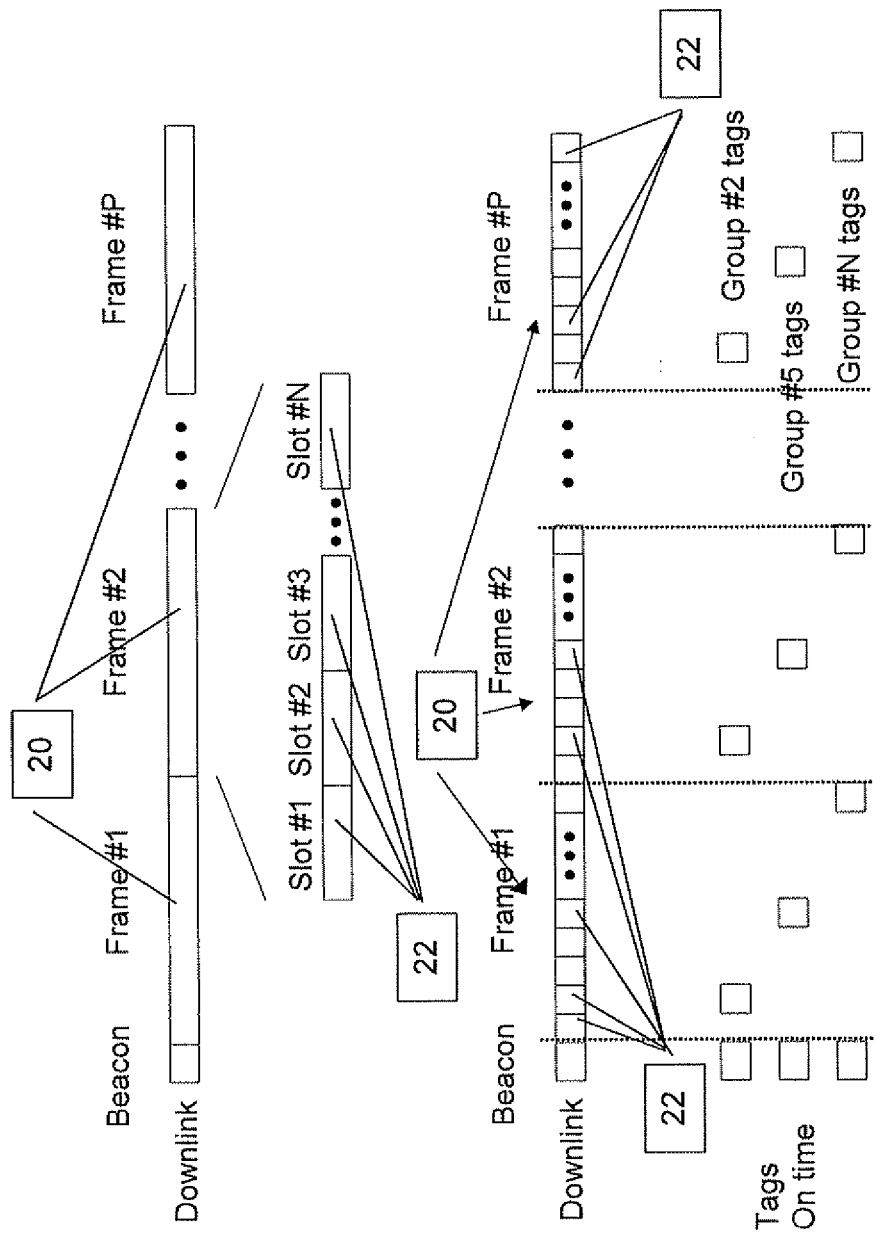
FIG. 2 is a schematic illustration of a Media Access Control protocol configured and operational according to the teachings of the present invention.

The system may work in "simple access mode" or in "beacon access mode". Similar to other MC methods, in beacon mode the Reader transmits a beacon message from time to time allowing the Tags to synchronize on the Reader timing. In simple mode, the Reader transmits only when it has data, and the Tags are not synchronized with the Reader timing. FIG. 2 shows Tag replies in a beacon scheme. The period between beacons is divided to frames 20 and each frame 20 is divided to slots 22.

Broadcast or multicast addressing is done according with the following principles:

A Tag ID is used to divide the Tag community to groups such as, by non-limiting example, use of four of the ID bits, divides the tag community into 16 tag groups.

While Tag ID is usually generated according to logistics and manufacturing guidelines, the use of a hash function spreads the Tag IDs to uniformly spread numbers where RANDOM_ID=Hash Function {ID}. Different parts of the RANDOM_ID will be used in order to divide the tag community into different MAC stages. It is preferable that the hash function make these stages (denoted for example as x, y and z) as orthogonal as possible, with minimal statistical dependency. That is to say, a hash function is used to transform the tag ID into a pseudo random ID, so as to achieve better spreading of tag population and lower statistical dependency between parameter dimensions.

For broadcast only, a random number could have been used by the Tag to set its membership in each of the sub-group types detailed below. However, the use of a known hash function ID allows the Readers to know exactly how to address a specific Tag when unicast or multicast addressing is desired. The use of a hash function has not been used in any previous MAC protocol.

Figure 3:
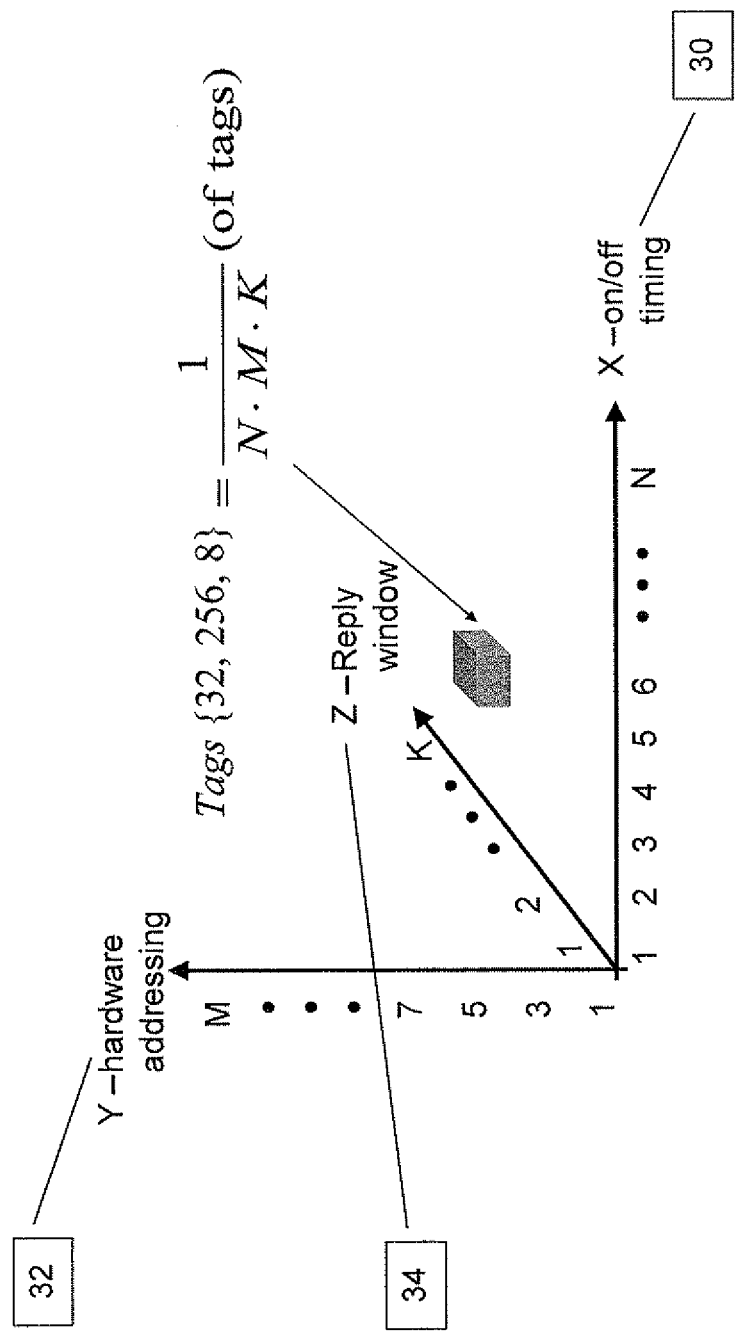
FIG. 3 is a schematic graphical illustration of an exemplary method for setting Tag IDs and separating Tags into subgroup types according to the teachings of the present invention.

The RANDOM_ID is used to separate Tags into sub-group types in several dimensions, as illustrated in FIG. 3:

"On-off time" 30 level sets each Tag "on" time into a beacon slot 20 (1 to N), as seen in FIG. 2.

Physical (PHY) addressing level sets the "hardware" addressing 32 (1 to M) for each Tag 6 in the community. The use of PHY address screening saves tag power by letting the tag screen non relevant messages in the PHY stage without needing to stay awake (power on) to process the full MAC header.

The Reply window 34 level sets the time offset for Tag reply (1 to K) and allows each Tag to choose one reply window out of a set of possible reply windows.

The following is a numeric example that illustrates a non-limiting possible practical implementation of the above multi-dimensional MAC scheme:

Assume that 5 bits of the RANDOM_ID (N=32 groups) are used for "on" time, 8 bits for PHY addressing (M=256 groups), and 3 bits for the reply window (K=8 groups). This divides the Tags into M*N=8,192 groups, therefore, per each broadcast message only approximately 1/8,000 of Tags will pass the PHY screening and will turn their processor on. Only 1/(M*N*K)=1/64,384 of Tags will reply in each reply window. Note that without PHY screening, 1/32 of tags would have had to decode the full MAC message although the message is only relevant to 1/8,192 of tags.

It will be appreciated that such a MAC system can dynamically adjust itself to handle a smaller community of Tags by using a smaller number of slots per frame (by non-limiting example 8 slots per frame), removing the hardware addressing screening, and/or setting the number of reply windows to 1. This allows dividing the Tags into 8 groups, providing a dynamic range of 8,000.

It should be noted that, in a case of a wrong estimation of Tag community size, too many Tags may reply simultaneously causing uplink congestion. A congestion resolution algorithm is used to resolve such congestion and the results of the congestion resolution are used for re-estimation of the Tag community size and adjustments in the number of Tag sub-groups used High Reliability When servicing a very large, unknown, community of Tags (i.e. X00,000), typical reliability of 99% or 99.9% will leave 1,000's of Tags not being serviced. To address this problem, the MAC of the present invention is configured in the following manner.

When sending a broadcast message from one or more Readers 4 to a very large community of Tags 6, we would like each of the Tags 6 to reply only once while overcoming possible collisions between Tag replies.

To significantly improve reliability of the system 2, a combination of "Session ID" (SID) and "relay" is used.

Figure 4:
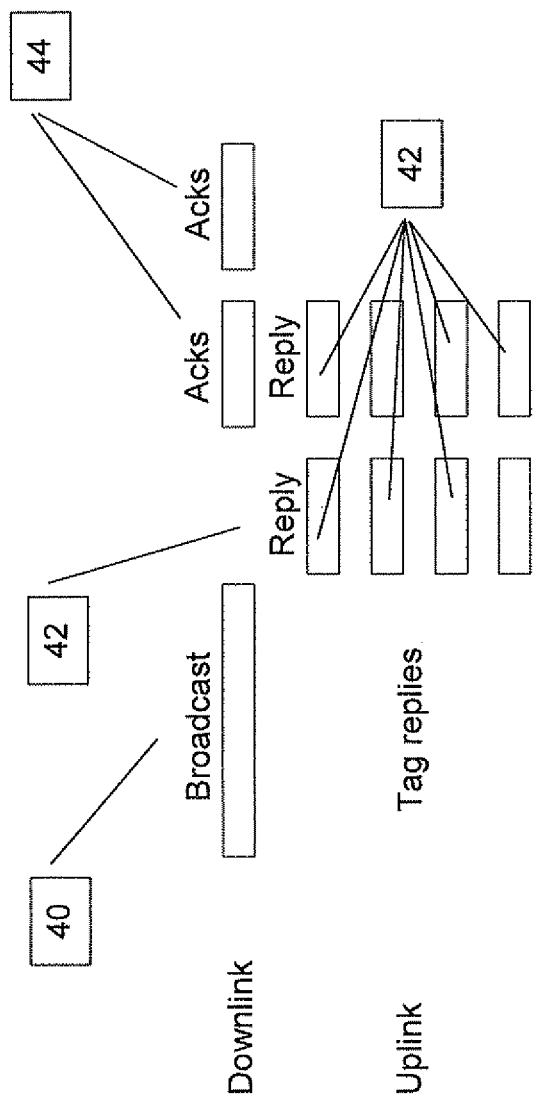
FIG. 4 is a schematic block diagram of Downlink and Uplink communication according to the teachings of the present invention.
Figure 5:
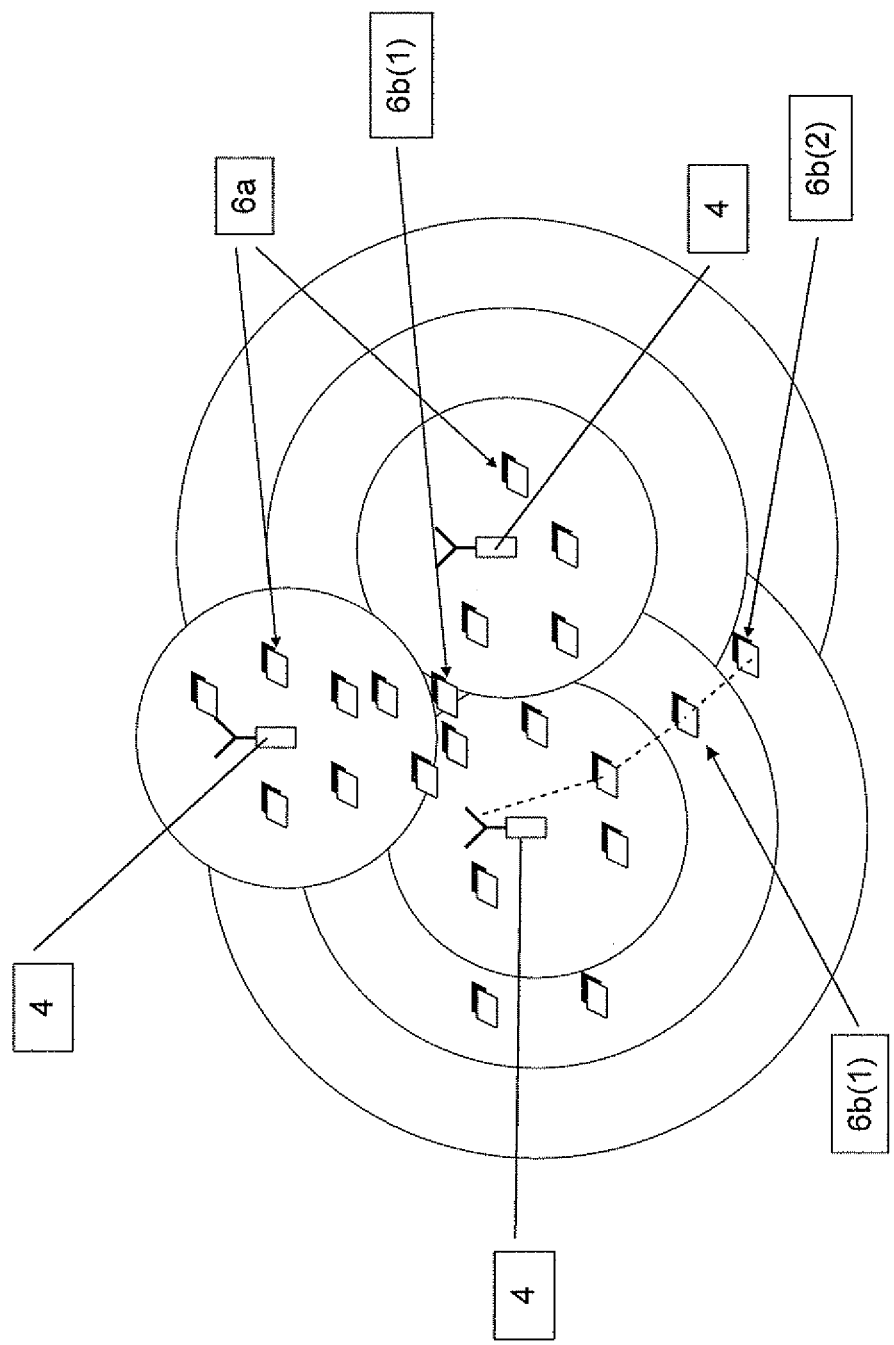
FIG. 5 is a schematic illustration of "relay" communication between Readers and Tags is a system of radio frequency communication between Readers and Tags, constructed and operational according to the teachings of the present invention.

A typical broadcast 40 by a Reader 4 to a plurality of Tags 6 has several steps:

1. A Reader 4 or plurality of Readers 4 transmits a broadcast 40 using a sub-grouping scheme relevant for the estimated Tag community size, and the multiple access scheme capacity, the Reader 4 will repeat transmission of the broadcast 40 enough times to cover all tag subgroup combinations.
2. All broadcast 40 transmissions include an SID used for that particular broadcast 40.
3. A Reader 4 receiving a Tag reply 42 will send an acknowledgement message (Acks) 44 to the sending Tag 6 (see FIG. 4).
4. A Tag 6 receiving an acknowledgement 44 from a Reader 4 will mark this SID as "acknowledged" and will not reply to further broadcast messages 40 with the same SID.
5. The number of groups is adjusted based on the number of Tags expected to reply to the next broadcast.
6. The SID may include a predefined length of time the SID is to be stored by the Tag, thereby enabling reuse of the SID in future broadcasts 40.
7. After covering all Tags sub-groups, the Reader 4 will repeat the broadcast 40 to larger groups of Tags 6, and on W those Tags 6 that have not received an acknowledgement 44 to their broadcast reply 42, in which the acknowledgement 44 contains the current SID, will reply.
8. After the process of step 6 is completed, the Reader 4 will initiate a relay session (as illustrated in FIG. 5) to address "Hidden Tags" 6b.

An Implementation Example of the Above

Assume a single Reader 4, sending a broadcast message to 10,000 Tags 6.

Tags 6 are divided to 16 groups for the on-off timing. The multiple access scheme allows 10 Tags 6 to reply simultaneously with an 18% collision probability (unslotted aloha with 100 channels).

In order to have an average of 10 Tag replies, in a 10,000 Tags community, the Tags 6 need to be divided to 1,000 groups. The division of groups is accomplished by a combination of 16 on-off groups, 8 hardware addressing groups, and 8 reply windows, thereby dividing the tag community into 16*8=128 groups. The Reader 4 then sends the broadcast message 40 to each of the 128 groups, each with 8 reply windows. This provides 128*8=1024 reply windows each of which can receive 10 replies for a total of 10240 reply opportunities.

Therefore, the Reader 4 is expected to receive a reply 42 from 10,000*82% of Tags 6, since there is an 18% expected reply collision rate. Thereby leaving 1,800 Tags 6, on average, whose reply to the Reader 4 has collided with other Tag replies and not been received by a Reader 4.

The Reader 4 will then adjusts the number of groups from the previous broadcast to accommodate an expected reply from the remaining 1,800 Tags 6 by creating 16*2=32 groups, each with 6 reply windows, providing 1920 reply opportunities. The 18% collision rate leaves 324 Tags 6, on average, whose reply has not been received by a Reader 4.

These 324 Tags 6 are now addressed by sending the broadcast 40 to 16*1=16 groups with 2 reply windows, providing 320 reply opportunities. The 18% collision rate leaves 59 Tags 6 that are addressed by sending the broadcast 40 to 8*1=8 groups with 1 reply window per broadcast providing 80 reply opportunities. This will result 7.5 replies per group, and collision rate of approximately 14%. Leaving 8 Tags 6 that will be addressed by sending the broadcast 40 to 4*1=4 groups with 1 reply window per broadcast having an approximately 4% collision rate. This leaves 0.3 "unserviced Tags".

That is to say, the total process included 16*8*8+16*2*6+16*1*2+8*1*1+8*1*1=1,264 reply windows (average throughput of 10,000/1,264=7.9 replies per window), and results in an average of 0.3 Tags 42 (99.997% reliability) that were not serviced by a Reader 4.

For comparison, a typical MAC system that does not use a SID, and Reader to Tag acknowledgement, should have repeated the first step (16*8 groups with 8 reply windows) for 6 times ($0.18^6 \approx 3*10^{-5}$)—requiring 16*8*8*6=6,144 reply windows, 5 times longer than the method of the present invention.

Another alternative system would be to send 20 transmissions per reply window, with a 33% collision rate. This process will need to be repeated 10 times to get to the 99.997% reliability, but each "session" will only use 4 reply windows resulting 16*8*4*10=5,120 windows, which is still 4 times longer than the method of the present invention.

The Use of Relay for High Access Reliability

Due to the RF complexity of warehouses including, but not limited to, metal containers, concrete walls and metal shelves, and a limited Tag-Reader link budget, it is assumed that a Reader 4 will not be able to achieve the required reliability of 99.9999%. Reliability may be increased by increasing the number of Readers 4 being used, but this is generally not cost effective. A more cost effective method, according to the teachings of the present invention, is to use any Tags 6a present within the warehouse in locations accessible to at least one of the Readers 4 as relays between Reader 4 and hidden Tags 6b (tags that are not accessed by the Reader directly).

After a Reader does not get any additional replies to its broadcast transmission, or a rate of direct replies from the tags falls below a predetermined threshold, the reader will initiate a relay session. This will be a specific message, marked as a "relay" message that "visible" Tags 6a who receive it will re-transmit, acting as if they were Readers (i.e. transmitting a message in the same physical and logical parameters as Reader). Hidden Tags 6b that do not receive the broadcast 40 from the Reader 4 due to link budget limitations, will receive at least one of the relay messages sent by the visible Tags 6a, and will send a reply to the visible Tag 6a. The visible Tag 6a will forward the hidden Tag's reply to the Reader 4. Tag will consider itself as being a hidden Tag 6b when it receives a forwarded message from visible Tag in which the message contains a new SID.

The Reader 4 may choose to broadcast the relay message to all Tags 6 such that all visible Tags 6a that receive the relay message will forward the message. Alternatively, Reader 4 may choose to broadcast the relay message only to predefined visible Tags 6a such as, but not limited to, visible Tags 6a located in places in the warehouse, for example, in proximity to areas known to have coverage problems or to visible Tags 6a having a stronger battery.

Figure 6:
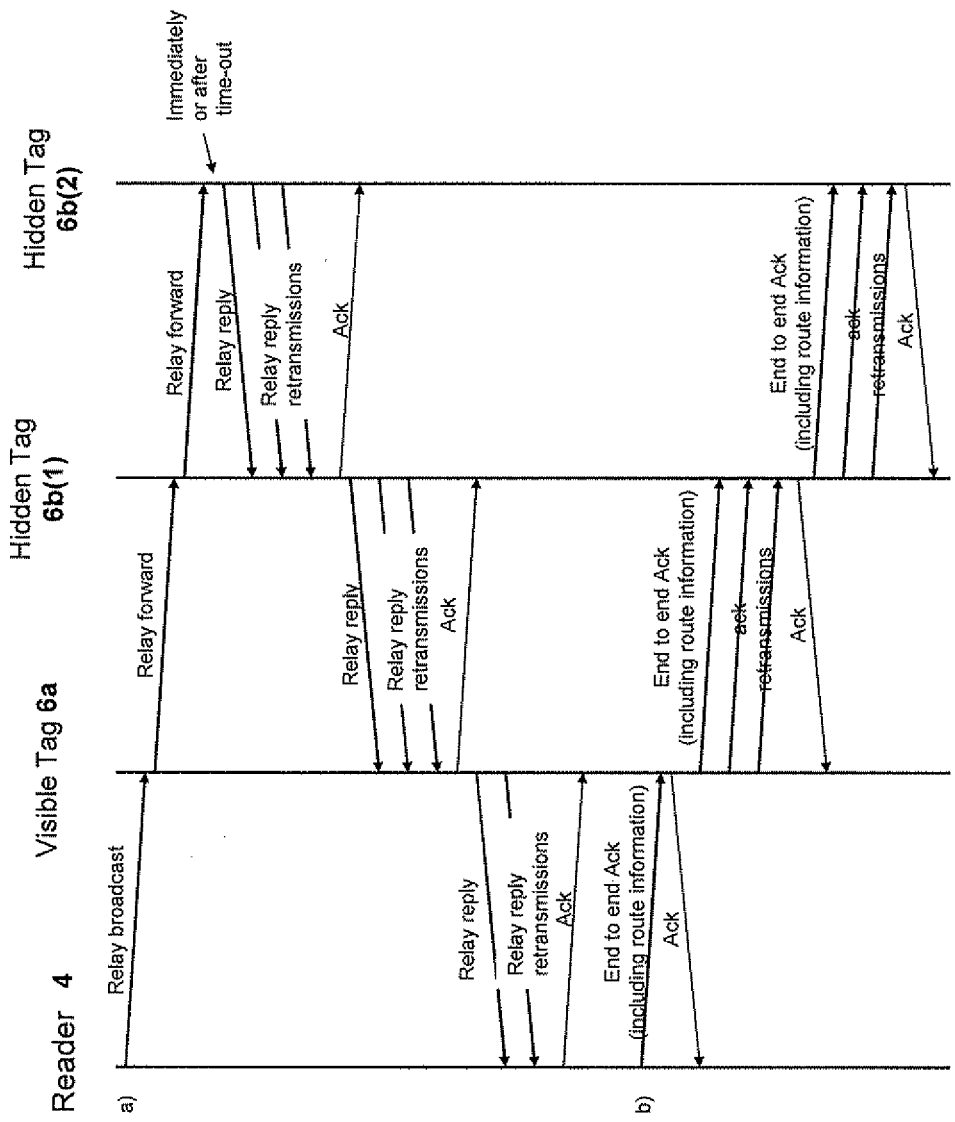
FIG. 6 is a schematic representation of "relay" communication in the system of FIG. 5.

The number of relay "hops" is the minimal number of different Tags that are needed in order to relay a message from the Reader 4 to a hidden Tag 6b and to relay the hidden Tag's 6b reply back to the Reader 4 as illustrated in FIG. 5. Therefore, a relay may be limited to single hop with one visible Tag between the Reader 4 and the hidden Tag 6b. Additionally, a multi-hop method in which both the message and acknowledgments from the Reader 4 are forwarded by a visible Tag 6a to a hidden Tag 6b(1) that in turn forwards it until it is received by a hidden Tag 6b(2) not in radio communication with either the Reader 4 or the visible Tag 6a. Likewise, the reply from the hidden Tag 6b(2) forwarded by hidden Tag 6b(1) to visible Tag 6a and then to Reader 4 is as illustrated in FIG. 6 which demonstrates a two hop data flow with acknowledgments between a Reader 4 and a hidden Tag 6b(2).

The use of Relay for achieving high reliability is also applicable for unicast and multicast transmissions.

Acknowledge Optimization

In a system where downlink (Reader to Tag) speed is not significantly faster than uplink (Tag to Reader) speed, the acknowledgements may become a performance limiting factor. Therefore, the system of the present invention first aggregates a plurality of acks into a single packet so as to reduce overhead and to use Tag sub-addresses in the ack. The Tag sub-address may be added using other bits of the RANDOM_ID (that is bits that are not used for other purposes such as on-off, PHY screening, and reply window selection). Therefore, only Tags who replied to the Reader's broadcast will look for their partial ID in the acks. Therefore, a shorter ID of 10-20 bits maybe used instead of the original ID of 32-64 bits, thereby improving downlink BW by a factor of up to 6.

A non-limiting example of Acknowledge optimization for a Tag ID of 8 bytes, which equals 64 bits, according to the present invention is as follows.

In a system according to the current state of the art before the present invention, for an average 10 replies per window, and 10 reply windows, 100 acks should be sent, using 64*100=6.4 kbits (assuming negligible ack overhead).

An exemplary embodiment of the present invention, may use 24 bits per ack, where the 24 bits are taken from the non-used bits of the RANDOM_ID. This will use only 24*100=2.4 kbits.

Assuming no statistical dependency between RANDOM_ID bits used for the ack and bits used for sub-grouping, the chances for a Tag receiving a wrong ack when 100 Tags reply to a given broadcast is calculated as follows. The chance of a Tag getting a wrong ack is $2^{-24}$. The chance of none of the 100 Tags getting a wrong ack is $1-(1-2^{-24})^{100}=6*10^{-6}$.

When the process repeats for approximately 100,000/80=1,250 times, the probability of getting an error is $1-(1-6*10^6)^{1250}$ which is less than 1% after servicing 100,000 Tags.

Future Compatibility

Due to the dynamic nature of some applications in which the system of the present invention is used in which tagged items move into and out of the Tag community of the system at differing rates such as in, by non-limiting example, warehouses, shipping yards and retail outlets, at any given time, the Tag community may include different generations of Tags, referred to herein as "old" and "new" Tags. It should be noted that as used herein, the terms "old Tags" and "new Tags" refer to the relative generational difference of one Tag to another. Therefore, any given tag is considered "new" relative to Tags from older generations and "old" in relative to Tags from newer generations.

Most communication systems currently in use with a non symmetric architecture (i.e. typically having small number of sophisticated Readers and large number of simple, low cost Tags), cope with Tag and Reader evolution by implementing "Backward compatibility". Two methods are generally known in the prior art:

a) New generation Tags working with old generation Readers. This is handled by new the generation Tags complying with the "old" rules, which is the classically backward compatibility approach.

b) New generation Readers working with old generation Tags or with a mixed network of old and new Tags. This is typically done by either having new generation Reader working in old generation protocol in a mixed network, or new generation Reader having to maintain a Tag generation association table, and maintaining different protocols for use with different Tag generations.

The system of the present invention provides a unique "forward compatibility" method. Herebelow are two non-limiting examples.

End Point Mac Forward Compatibility

MAC messages contain a MAC length indicator indicating the MAC payload (e.g. application layer data) beginning. The MAC itself is processed according to field content. Therefore new generation Tags or Readers may add new fields to the MAC. Old generation Tags/Readers stop decoding the MAC when they reach unfamiliar information and "jump" to the payload start, while new generation Tags will continue to process the remainder of the MAC. The same method can be used when an old generation Reader decodes a new generation Tag message. That is to say, each generation of Readers and/or Tags decode that portion of the Media Access Control protocol with which it is familiar, ignores that portion of the Media Access Control protocol with which it is unfamiliar and jumps to the payload start point. In this way there is no need to send different messages to different generation Tags, so one broadcast message can hold both old generation Tags information and instructions with additional new generation Tag information, thereby increasing system efficiency.

Mesh MAC Forward Compatibility

In a mesh network that has a small number of Readers, and large number of Tags, where Tags can communicate with each other, usually acting as relays, forwarding Reader message to remote Tags, or returning remote Tag reply, a mixture of Tags generations or versions is more challenging.

The present invention adds a "future block" to the MAC data relayed from one Tag to the other. Old generation Tags will forward this block as is, while new generation Tags/Readers can decode the content of this block, and change it if applicable. That is to say, the Media Access Control protocol includes a future block that old generation Tags forward without decoding, and new generation tag Readers and/or Tags decode as needed. This allows for efficient mixture of Tags and Readers of different versions allowing old generation Tags to relay new generation messages, new generation Tags to relay messages to old generation tags while avoiding the for Readers to send different broadcasts for each generation of Tags in the Tag community.

It will be appreciated that the above descriptions are intended only to serve as examples and that many other embodiments are possible within the spirit and the scope of the present invention.

What is claimed is:

1. A system for radio frequency communication between Readers and Tags, the system comprising;
   (a) at least one tag Reader;
   (b) a plurality of Tags deployed in a region in which at least some of the Tags are in radio communication with said tag Reader, at least some tags are in radio communication with other Tags in said plurality of Tags, and each tag is associated with a unique tag ID; and
   (c) a Media Access Control protocol according to which:
       said tag Reader is configured to send and receive radio communications to and from at least some of said plurality of Tags,
       said plurality of Tags are configured to send and receive radio communications to and from said tag Reader and other Tags in said plurality of Tags, wherein said plurality of Tags are divided into groups based on at least part of the unique ID of each tag, and
   wherein said tag Reader is configured to initiate a relay session after a rate of direct replies from said plurality of tags falls below a predetermined threshold, wherein initiation of the relay session causes at least one of the Tags to relay radio communications to or from another Tag that has not received the radio communication from said tag Reader.

2. The system of claim 1, wherein a portion of said tag ID is used by said tag Reader to indicate to at least one tag of said plurality of Tags that said tag Reader received a said radio communication from that particular tag.

3. The system of claim 1, wherein according to said Media Access Control protocol said radio communications between said tag Reader and said plurality of Tags are controlled, and said radio communications use a combination of a session ID, acknowledgements, and use of other tags as relays for radio communications; and
   wherein each broadcast message is given a respective session ID, and at least one Tag of said plurality of Tags is configured to reply to radio communications having a particular session ID until said at least one Tag receives an acknowledgement radio communication having the same session ID.

4. The system of claim 3, wherein according to said Media Access Control protocol said tag Reader is configured to send an acknowledgment radio communication having a particular session ID comprising acknowledgments from more than one of the plurality of Tags that responded to a radio communications having the particular session ID wherein said acknowledgments comprise a sub-address for each of the plurality of Tags that responded.

5. The system of claim 1, wherein the plurality of Tags are assigned a pseudo-random ID based on the unique tag ID and a hash function and wherein the plurality of Tags are divided into groups based on one or more parts of the pseudo-random ID.

6. The system of claim 1, wherein initiation of a relay session comprises said tag Reader being configured to send a relay radio communication that causes at least one tag of said plurality of Tags that has already received an acknowledgement radio communication having a same session ID as the relay radio communication to forward the relay radio communication to or from another Tag.

7. The system of claim 6, wherein at least one tag of said plurality of Tags is configured to respond to said relay radio communication if said at least one Tag has not previously received a radio communication having the same session ID as said relay radio communication.

8. A system for radio frequency communication between Readers and Tags, the system comprising;
   (a) at least one tag Reader;
   (b) a plurality of Tags deployed in a region in which at least some of the Tags are in radio communication with said tag Reader, and wherein at least some tags are in radio communication with other Tags in said plurality of Tags; and
   (c) a Media Access Control protocol according to which:
       said tag Reader is configured to send and receive radio communications to and from at least some of said plurality of Tags,
       said plurality of Tags are configured to send and receive radio communications to and from said tag Reader and other Tags in said plurality of Tags, and
       said Media Access Control protocol is configured to control said radio communication between said tag Reader and said plurality of Tags;
   wherein said Media Access Control protocol includes tag reply parameters in each said radio communication so as to enable tags to respond to said tag Reader in a manner that is compatible with that tag Reader's capabilities, wherein said tag reply parameters comprise indications of the tag Reader's capabilities; and
   wherein said plurality of Tags includes at least one Tag that is configured to transmit or receive a given radio communication, said given radio communication including a block of variable length wherein a first generation receiving Tag is configured to forward said block without modification and a second generation receiving Tag is configured to decode and modify said block.

9. A system for radio frequency communication between Readers and Tags, the system comprising;
   (a) at least one tag Reader;
   (b) a plurality of Tags deployed in a region in which at least some of the Tags are in radio communication with said tag Reader, at least some tags are in radio communication with other Tags in said plurality of Tags, and each tag is associated with a unique tag ID; and
   (c) a Media Access Control protocol according to which:
       said tag Reader is configured to send and receive radio communications to and from at least some of said plurality of Tags,
       said plurality of Tags are configured to send and receive radio communications to and from said tag Reader and other Tags in said plurality of Tags, wherein said plurality of Tags are divided into groups based on at least part of the unique ID of each tag, and
       said Media Access Control protocol is configured to control said radio communication between said tag Reader and said plurality of Tags;
   wherein said radio communication includes an indication of a payload start point, and wherein each tag Reader and/or Tag is configured to decode that portion of said Media Access Control protocol with which the respective generation of tag Reader and/or Tag is familiar, ignore that portion of said Media Access Control protocol with which the respective generation of tag Reader and/or Tag is unfamiliar, and jump to said payload start point, thereby allowing tag Readers to communicate with a mixture of tag generations;
   wherein said tag Reader is configured to initiate a relay session after a rate of direct replies from said plurality of Tags falls below a predetermined threshold, wherein initiation of the relay session causes at least one of the Tags to relay radio communications to or from another Tag that has not received the radio communication from said tag Reader.

10. The system of claim 9, wherein the plurality of Tags are assigned a pseudo-random ID based on the unique tag ID and a hash function and wherein the plurality of Tags are divided into groups based on one or more parts of the pseudo-random ID.

11. The system of claim 9, wherein initiation of a relay session comprises said tag Reader being configured to send a relay radio communication that causes at least one tag of said plurality of Tags that has already received an acknowledgement radio communication having a same session ID as the relay radio communication to forward the relay radio communication to or from another Tag.

12. The system of claim 11, wherein at least one tag of said plurality of Tags is configured to respond to said relay radio communication if said at least one Tag has not previously received a radio communication having the same session ID as said relay radio communication.

13. A system for radio frequency communication between Readers and Tags, the system comprising;
    (a) at least one tag Reader;
    (b) a plurality of Tags deployed in a region in which at least some of the Tags are in radio communication with said tag Reader, wherein at least some tags are in radio communication with other Tags in said plurality of Tags; and
    (c) a Media Access Control protocol according to which:
        said tag Reader is configured to send and receive radio communications to and from at least some of said plurality of Tags,
        said plurality of Tags are configured to send and receive radio communication to and from said tag Reader and other Tags in said plurality of Tags, and
        said Media Access Control protocol is configured to control said radio communication between said tag Reader and said plurality of Tags;
    wherein said plurality of tags includes at least one Tag that is configured to transmit or receive a given radio communication, said given radio communication including a block of variable length wherein a first generation receiving Tag is configured to forward said block without modification and a second generation receiving Tag is configured to decode and modify said block.

14. The system of claim 13, wherein said radio communication includes an indication of payload start point, and each generation of tag Readers and/or Tags decode a portion of said Media Access Control protocol with which the respective generation of tag Readers and/or Tags is familiar, ignore that portion of said Media Access Control protocol with which the respective generation of tag Readers and/or Tags is unfamiliar, and jump to said payload start point thereby allowing tag Readers to efficiently communicate with a mixture of tag generations and/or tag versions.

* * * * *

UNITED STATES PATENT AND TRADEMARK OFFICE
CERTIFICATE OF CORRECTION

PATENT NO. : 8,422,398 B2
APPLICATION NO. : 12/018228
DATED : April 16, 2013
INVENTOR(S) : Ripstein et al.

It is certified that error appears in the above-identified patent and that said Letters Patent is hereby corrected as shown below:

In the Specification

Column 5,
Line 40, "start point allowing reader" should read --start point, allowing reader--.

Column 8,
Line 4, "MC methods" should read --MAC methods--.

Column 9,
Lines 9 and 10, "sub-groups used" should read --sub-groups used.--;
Lines 46 and 47, "on W" should read --only--.

Signed and Sealed this
Seventeenth Day of September, 2013

Teresa Stanek Rea
*Deputy Director of the United States Patent and Trademark Office*